United States Patent
Okai (10) Patent No.: US 10,800,114 B2
(45) Date of Patent: Oct. 13, 2020

(54) MOLDING METHOD FOR COMPOSITE MATERIAL AND INTERMEDIATE MEMBER FOR COMPOSITE MATERIAL

(71) Applicant: Nissan Motor Co., Ltd., Yokohama-shi, Kanagawa (JP)

(72) Inventor: Hiroaki Okai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/321,845

(22) PCT Filed: Aug. 9, 2016

(86) PCT No.: PCT/JP2016/073493
§ 371 (c)(1),
(2) Date: Jan. 30, 2019

(87) PCT Pub. No.: WO2018/029792
PCT Pub. Date: Feb. 15, 2018

(65) Prior Publication Data
US 2019/0168469 A1 Jun. 6, 2019

(51) Int. Cl.
*B29C 70/48* (2006.01)
*B29C 39/10* (2006.01)
(Continued)

(52) U.S. Cl.
CPC ............ *B29C 70/48* (2013.01); *B29C 39/10* (2013.01); *B29C 45/14* (2013.01); *B29C 70/541* (2013.01); *B29C 70/543* (2013.01); *B29C 70/68* (2013.01)

(58) Field of Classification Search
CPC ......... B29C 39/10; B29C 39/24; B29C 44/12; B29C 70/00; B29C 33/12;
(Continued)

(56) References Cited

U.S. PATENT DOCUMENTS 6,500,376 B1 * 12/2002 Pack .................. B29C 45/1635
264/2.2
2013/0001817 A1 * 1/2013 Bessho ................. B29C 45/561
264/45.3

(Continued)

FOREIGN PATENT DOCUMENTS

CN 104853903 A 8/2015
DE 10 2013 218 572 A1 3/2015
(Continued)

*Primary Examiner* — Alison L Hindenlang
*Assistant Examiner* — Debjani Roy
(74) *Attorney, Agent, or Firm* — Global IP Counselors, LLP (57) ABSTRACT

A molding method for a composite material by disposing a reinforcing base material within a cavity of an openable/closable molding die, injecting resin into the cavity and curing the resin. In particular support member is caused to penetrate a reinforcing base material and is disposed such that at least one end portion of the support member projects from the reinforcing base material. Next, the reinforcing base material and the support member are disposed within a cavity of a molding die, the molding die is closed, at least one end portion of the support member is brought into contact with wall surfaces of the molding die that form the cavity. Finally, resin is injected into the cavity from an injection port of the molding die while a state in which the at least one end portion is brought into contact with the wall surface is maintained.

9 Claims, 9 Drawing Sheets

(51) Int. Cl.
*B29C 45/14* (2006.01)
*B29C 70/68* (2006.01)
*B29C 70/54* (2006.01)

(58) Field of Classification Search
CPC ............ B29C 2043/3668; B29C 70/48; B29C 70/541; B29B 11/16
See application file for complete search history.

(56) References Cited

U.S. PATENT DOCUMENTS

2015/0336329 A1\* 11/2015 Lehmann ................ B29B 11/16
156/73.1
2017/0129141 A1\* 5/2017 Masaka ................... B29C 33/14

FOREIGN PATENT DOCUMENTS

| | | |
|---|---|---|
| DE | 10 2014 009 408 A1 | 12/2015 |
| EP | 2 228 199 A1 | 9/2010 |
| GB | 2 245 862 B | 1/1994 |
| JP | 63-27221 A | 2/1988 |
| JP | H02-74325 A | 3/1990 |
| JP | H04-135720 A | 5/1992 |
| JP | 4-257406 A | 9/1992 |
| JP | 2003071871 * 3/1995 ............ B41M 5/44 |
| JP | 3849567 B2 | 11/2006 |
| JP | 2010-221642 A | 10/2010 |
| JP | 2013-252644 A | 12/2013 |
| JP | 2015-535535 A | 12/2015 |
| WO | 91-08892 A1 | 6/1991 |
| WO | 92/00845 A1 | 1/1992 |
| WO | 2014/075198 A1 | 5/2014 |

\* cited by examiner

MOLDING METHOD FOR COMPOSITE MATERIAL AND INTERMEDIATE MEMBER FOR COMPOSITE MATERIAL

CROSS-REFERENCE TO RELATED APPLICATIONS

This application is a U.S. national stage application of International Application No. PCT/JP2016/073493, filed on Aug. 9, 2016.

BACKGROUND

Technical Field

The present invention relates to a molding method and an intermediate member for composite material.

Background Information

In recent years, composite materials made by impregnating a reinforcing base material with resin have been used as automobile parts to reduce automobile body weight. An RTM (Resin Transfer Molding) molding method, which is suitable for mass production, is attracting attention as a molding method for composite material. In the RTM molding method, first, a reinforcing base material is placed in a cavity of a molding die, resin in poured into the cavity, the reinforcing base material is impregnated with the resin, and the resin is cured, thereby forming a composite material.

When the resin is poured into the cavity, disorder in the arrangement of the reinforcing base material may occur due to the flow of the resin. If the arrangement of the reinforcing base material is disturbed, there is the problem of reduced strength of the composite material as the molded article, or of deteriorated quality of appearance.

For example, Japanese Laid-Open Patent Application No. 2010-221642 (Patent Document 1) discloses a method for suppressing the disorder in the arrangement of the reinforcing base material by sandwiching the reinforcing base material by means of the wall surfaces of a die molding when the resin is injected in order to suppress the disorder in the arrangement of the reinforcing base material.

SUMMARY

In order to shorten the molding time, it is necessary to inject the resin at high pressure. When the resin is injected at high pressure, the disorder in the arrangement of the reinforcing base material cannot be sufficiently suppressed by simply holding the reinforcing base material with the wall surfaces of the molding die. On the other hand, if the resin is injected at low pressure in order to suppress the disorder in the arrangement of the reinforcing base material, impregnation of the reinforcing base material with the resin is delayed, and the molding time is prolonged.

Therefore, an object of the present invention is to provide a molding method and an intermediate member for composite material that improve the quality of appearance of the composite material by suppressing the disorder in the arrangement of the reinforcing base material when the resin is injected into the cavity of the molding die, and that shorten the molding time by enabling high-pressure injection of the resin.

The molding method for composite material in accordance with the present invention which achieves the object described above is a molding method for forming a composite material by disposing a reinforcing base material within a cavity of an openable/closable mold, injecting resin into the cavity, and curing the resin. In accordance with the molding method for composite material, a support member penetrates the reinforcing base material, and is disposed such that at least one end portion of the support member projects from the reinforcing base material and the reinforcing base material and the support member are disposed within the cavity. The molding die is then closed, the at least one end portion of the support member is brought into contact with the wall surfaces of the molding die that forms the cavity, and the resin is injected into the cavity from an injection port of the molding die while a state in which the at least one end portion of the support member is in contact with the wall surfaces is maintained.

The intermediate member for composite material in accordance with the present invention which achieves the object described above comprises a preform obtained by forming a reinforcing base material into a prescribed shape, and a support member that penetrates the reinforcing base material and disposed such that at least one end portion projects from the reinforcing base material.

DETAILED DESCRIPTION OF THE EMBODIMENTS

Embodiments of the present invention will be explained below with reference to the appended drawings. The description below does not limit the technical scope or the meanings of the terms described in the Claims. Dimensional ratios in the drawings are exaggerated for the sake of convenience of explanation and may differ from actual ratios.

Figure 9A:
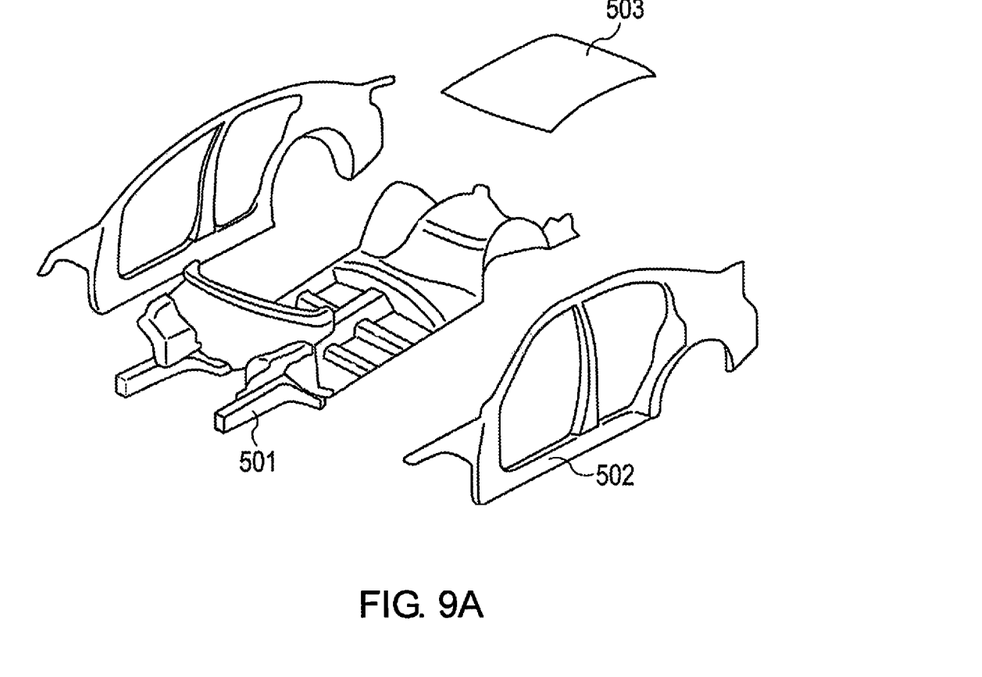
FIG. 9A is a view illustrating application examples of composite material that is molded by means of the molding method in accordance with the embodiment, and a view illustrating various automobile parts that use the composite material.
Figure 9B:
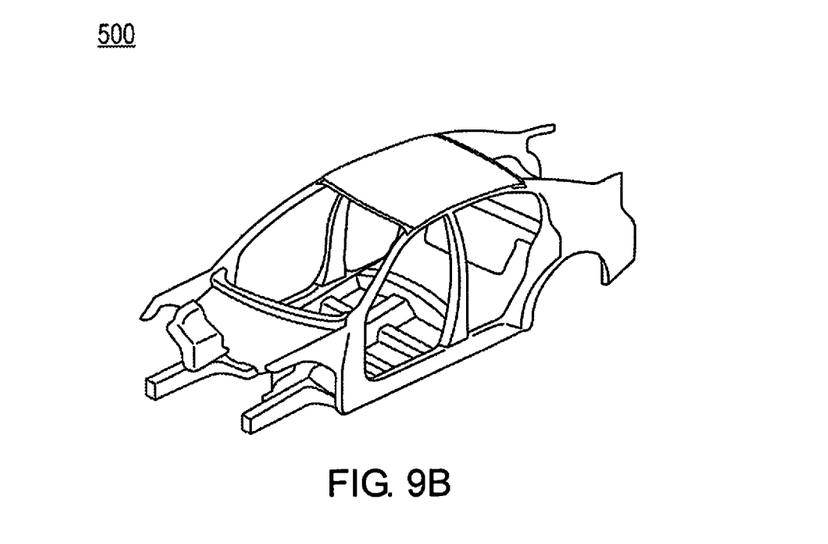
FIG. 9B is a view illustrating application examples of composite material that is molded by means of the molding method in accordance with the embodiment, and a view illustrating a vehicle body that is formed by joining the various automobile parts that use the composite material.

In general, a composite material 10 provides greater strength and rigidity compared with a molded article made solely of resin 50 by means of combining the resin 50 with a reinforcing base material 31. For example, the composite material 10 can be applied to a frame component such as a front side member 501 or a pillar 502, or an outer panel component such as a roof 503, which are used in a vehicle body 500 (refer to FIG. 9B) of an automobile, such as those illustrated in FIG. 9A. Because the composite material 10 is lighter than steel material, it is possible to reduce the weight of the vehicle body 500, such as is illustrated in FIG. 9B, compared with a vehicle body formed by assembling parts that are made of steel material.

The composite material 10 in accordance with the present embodiment is molded by disposing an intermediate member 20 for composite material, described further below, in a molding die 310, which is impregnated with the resin 50 and cured.

Epoxy resins, phenol resins, etc., which are thermosetting resins, are used as the resin 50. In the present embodiment, an epoxy resin that has excellent mechanical properties and dimensional stability is used. The epoxy resin typically used is a two-component type, which is used by mixing a main agent and a curing agent. Generally, a bisphenol A type epoxy resin is used as the main agent and an amine type is used as the curing agent, but no limitation is imposed thereby, and the agents may be appropriately selected depending on the desired material properties. The resin 50 is not limited to thermosetting resin, and a thermoplastic resin may be used as well.

In addition, an internal mold releasing agent is contained in the resin 50 to facilitate demolding after the composite material 10 is molded. The type of the internal mold releasing agent is not particularly limited, and a well-known agent may be used.

Figure 1A:
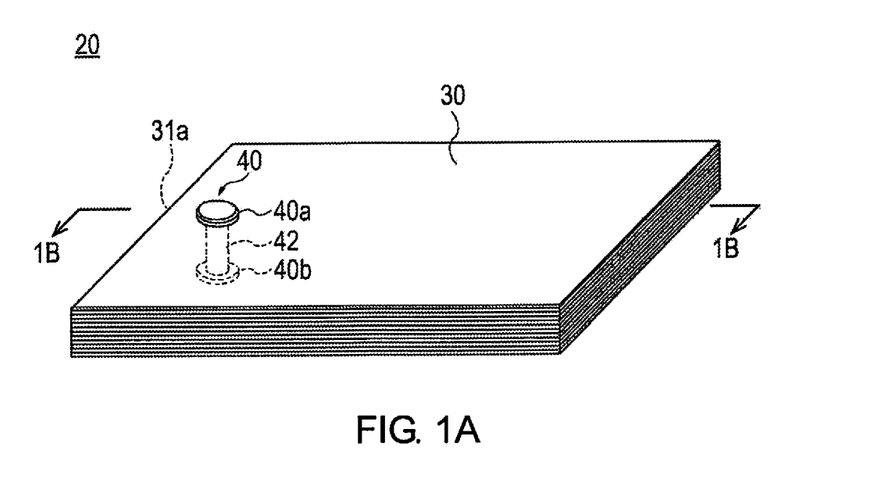
FIG. 1A is a perspective view illustrating an intermediate member for composite material in accordance with an embodiment.
Figure 1B:
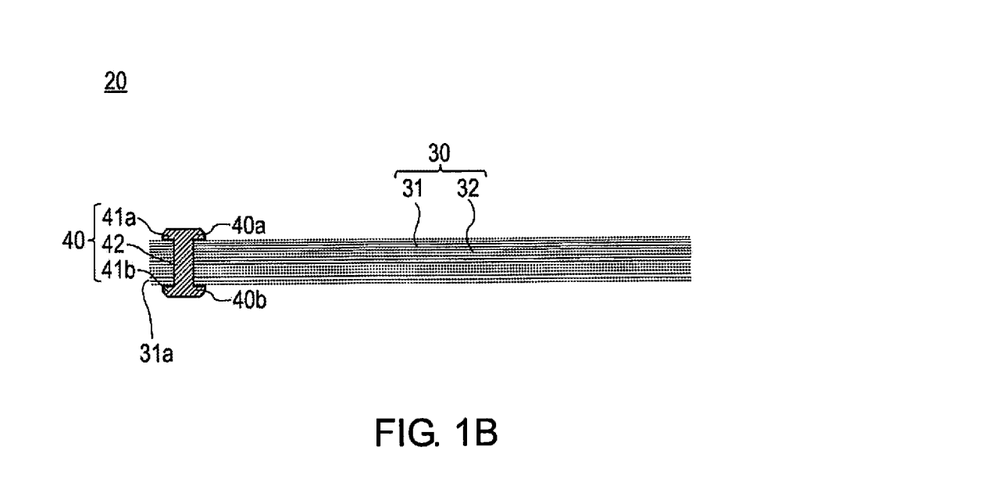
FIG. 1B is a cross-sectional view through line 1B-1B in FIG. 1A.

The intermediate member 20 for composite material (hereinafter referred to as "intermediate member") comprises a preform 30 obtained by forming a reinforcing base material 31 into a prescribed shape, and a penetrating member (corresponding to the support member) 40 that is disposed at one end portion thereof, as illustrated in FIG. 1A. The penetrating member 40 penetrates the reinforcing base material 31 and is fixed, disposed so that both end portions 40a, 40b project from the reinforcing base material 31, as is illustrated in FIG. 1B. The arrangement and the number of the penetrating member 40 may be appropriately changed in accordance with the arrangement of an injection port 315, the injection pressure of the resin 50, the shape of the preform 30, and the like.

The configurations of the preform 30 and the penetrating member 40 will be described in detail below.

The preform 30 in accordance with the present embodiment is formed by stacking a plurality of reinforcing base materials 31, applying an adhesive 32, and forming into a prescribed shape, as illustrated in FIG. 1B.

The reinforcing base material 31 can be formed from, for example, carbon fiber, glass fiber, aramid fiber, polyamide (PA) fiber, polypropylene (PP) fiber, and acrylic fiber. In the present embodiment, an example in which carbon fiber is used as the reinforcing base material 31 will be described. Carbon fiber is characterized by a low coefficient of thermal expansion, excellent dimensional stability, and little degradation of mechanical properties even at high temperatures, and thus is suitably used as the reinforcing base material 31 of the composite material 10 for an automobile vehicle body 500 (refer to FIG. 9B), and the like. For example, sheet-shaped carbon fiber, such as a UD (unidirectional) material in which the fibers are aligned in one direction, or a textile material in which the fibers are combined horizontally and vertically, can be used as the reinforcing base material 31.

The adhesive 32 is applied to the reinforcing base materials 31 to bond the reinforcing base materials 31 to each other. It is thereby possible to stably maintain the reinforcing base materials 31 in a desired form, and to suppress the deviation in the arrangement of the reinforcing base materials 31. The adhesive 32 also serves to maintain the form when the reinforcing base materials 31 are formed to the desired shape.

The material constituting the adhesive 32 is not particularly limited, and a well-known material can be used. Examples include thermoplastic resin such as polyolefin resin, styrene resin, nylon resin, and polyurethane resin, and thermosetting resin such as epoxy resin, phenol resin, and unsaturated polyester resin.

The penetrating member 40 has a cylindrical shape and includes a head portion 41a formed at one end portion 40a, a head portion 41b formed at the other end portion 40b, and a body portion 42 with a smaller diameter than the head portion's 41a, 41b, as illustrated in FIGS. 1A and 1B. The head portions 41a, 41b of the penetrating member 40 are disposed so as to project from the reinforcing base material 31. The head portion 41b of the penetrating member 40 is formed by extending the body portion 42 through the preform 30 and then crushing the other end portion 40b. Here, the head portion 41b is formed to have a larger diameter than the body portion 42. The penetrating member 40 has the function of a rivet that is fixed to the reinforcing base material 31 by means of the head portions 41a, 41b, and the body portion 42. The penetrating member 40 is not limited to the cylindrical shape, and may be prismatic, for example.

As described further below, the head portions 41a, 41b of the penetrating member 40 are interposed between wall surfaces 311a, 312a of the molding die 310 and the reinforcing base material 31 to form a gap G (refer to FIG. 5). The size of the gap G can be appropriately adjusted by adjusting the heights of the head portions 41a, 41b of the penetrating member 40.

The material constituting the penetrating member 40 preferably has a property of softening with heat. By providing the penetrating member 40 with the property of softening with heat, the gap G between the reinforcing base material 31 and the wall surfaces 311a, 312a of the molding die 310 can be gradually reduced by softening the head portions 41a, 41b by means of the reaction heat of the resin 50 or the heat from the molding die 310 and by crushing.

In addition, among those materials which have the property of softening with heat from which the penetrating member 40 is constituted, a thermoplastic resin is preferable, which is an organic material. Using an organic material facilitates recycling or incineration during disposal of the composite material 10 as a molded article. Additionally, forming the penetrating member 40 from a thermoplastic resin makes it possible to melt the penetrating member 40 with the reaction heat of the flowing resin 50 or the heat from the molding die 310 when the reinforcing base material 31 is impregnated with the resin 50.

Moreover, the material constituting the penetrating member 40 preferably has an affinity with the resin 50. Here, "affinity" refers to the property of mixing readily. In the present embodiment, a material that mixes with the resin 50 when the penetrating member 40 melts and that does not affect the physical properties of the resin 50 is selected as the material having affinity. Examples of such a material having affinity are materials that are used for sizing the reinforcing base materials 31, such as starch resin.

Since the penetrating member 40 has affinity with the resin 50, when the reinforcing base material 31 is impregnated with the resin 50, the penetrating member 40 melts and mixes with the resin 50 and is integrally formed therewith. Thus, the composite material 10 can be formed homogeneously, and post-processing for removal of the peripheral portions of the penetrating member 40 and the reinforcing base material 31 in which the penetrating member 40 is disposed can be reduced. Thus, the molding time can be reduced and the yield improved. In addition, such characteristics of the composite material 10 as the strength can be improved.

The material that constitutes the penetrating member 40 and the size thereof can be adjusted insofar as the physical properties of the composite material 10 are not affected, even when this material is dissolved in the resin 50, taking into consideration the mixing ratio of the entire composite material 10 relative to the resin 50.

One example of a molding device 100 that embodies the molding method for composite material 10 in accordance with the present embodiment will be described with reference to FIGS. 2A to 3. The configuration of the molding device 100 is not limited to that described below, as long as it is possible to realize the molding method for composite material 10 in accordance with the present embodiment.

The molding device 100 comprises an intermediate member forming unit 200 (refer to FIGS. 2A-2C) for forming an intermediate member 20, a composite material molding unit 300 (refer to FIG. 3) for molding the composite material 10 using the intermediate member 20, and a control unit 400 that controls the operations of the intermediate member forming unit 200 and the composite material molding unit 300.

Figure 2A:
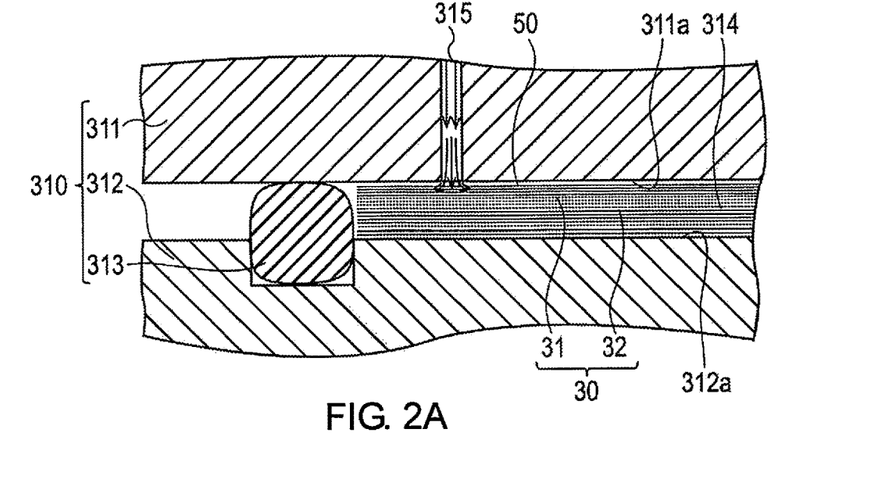
FIG. 2A is a partial cross-sectional view for explaining the operation of disposing a penetrating member on a reinforcing base material with an intermediate member forming unit in accordance with the embodiment.
Figure 2B:
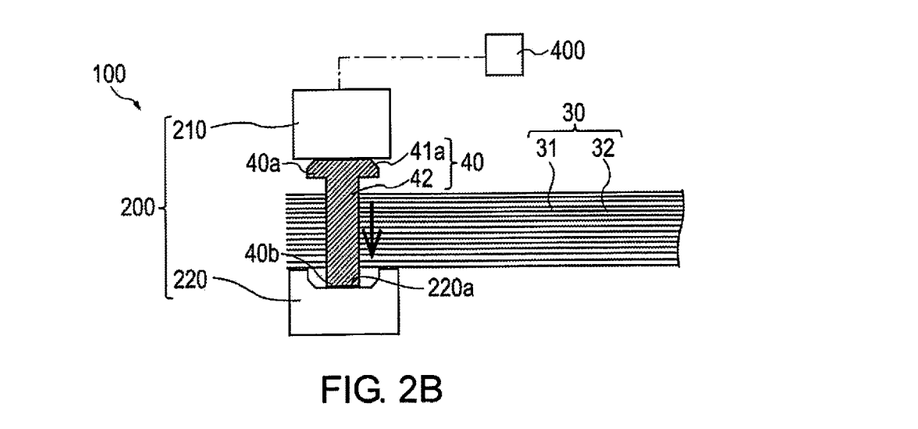
FIG. 2B is a partial cross-sectional view for explaining the operation of disposing the penetrating member on the reinforcing base material with the intermediate member forming unit in accordance with the embodiment.
Figure 2C:
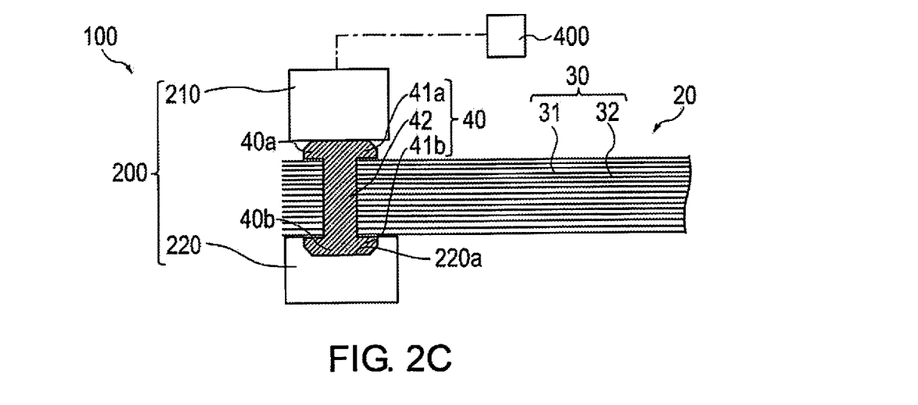
FIG. 2C is a partial cross-sectional view for explaining the operation of disposing the penetrating member on the reinforcing base material with the intermediate member forming unit in accordance with the embodiment.

The intermediate member forming unit 200 includes a pressing part 210 that applies a pressing force to the head portion 41a of the one end portion 40a, and a receiving part 220 that is brought into contact with the other end portion 40b of the penetrating member 40, as is illustrated in FIG. 2A.

The pressing part 210 is driven by a drive source such as a motor (not shown) and applies the pressing force to the penetrating member 40 such that the body portion 42 of the penetrating member 40 penetrates the reinforcing base material 31 toward the stacking direction (direction of the arrow in FIG. 2A) of the reinforcing base material 31. In addition, after the penetrating member 40 penetrates the reinforcing base material 31, the pressing part 210 applies additional pressing force to the penetrating member 40 and presses the end portion 40b of the penetrating member 40 against the receiving part 220, as is illustrated in FIG. 2B.

The receiving part 220 has a recessed portion 220a on the upper surface thereof. The end portion 40b of the penetrating member 40 is pressed against the recessed portion 220a and deforms from the pressing force that is received from the pressing part 210, and the head portion 41b, to which the shape of the recessed portion 220a is transferred, is formed at the end portion 40b of the penetrating member 40, as illustrated in FIG. 2C. The reinforcing base material 31 can be sandwiched by means of the head portions 41a, 41b of the penetrating member 40 to fix the penetrating member 40 with respect to the reinforcing base material 31.

Figure 3:
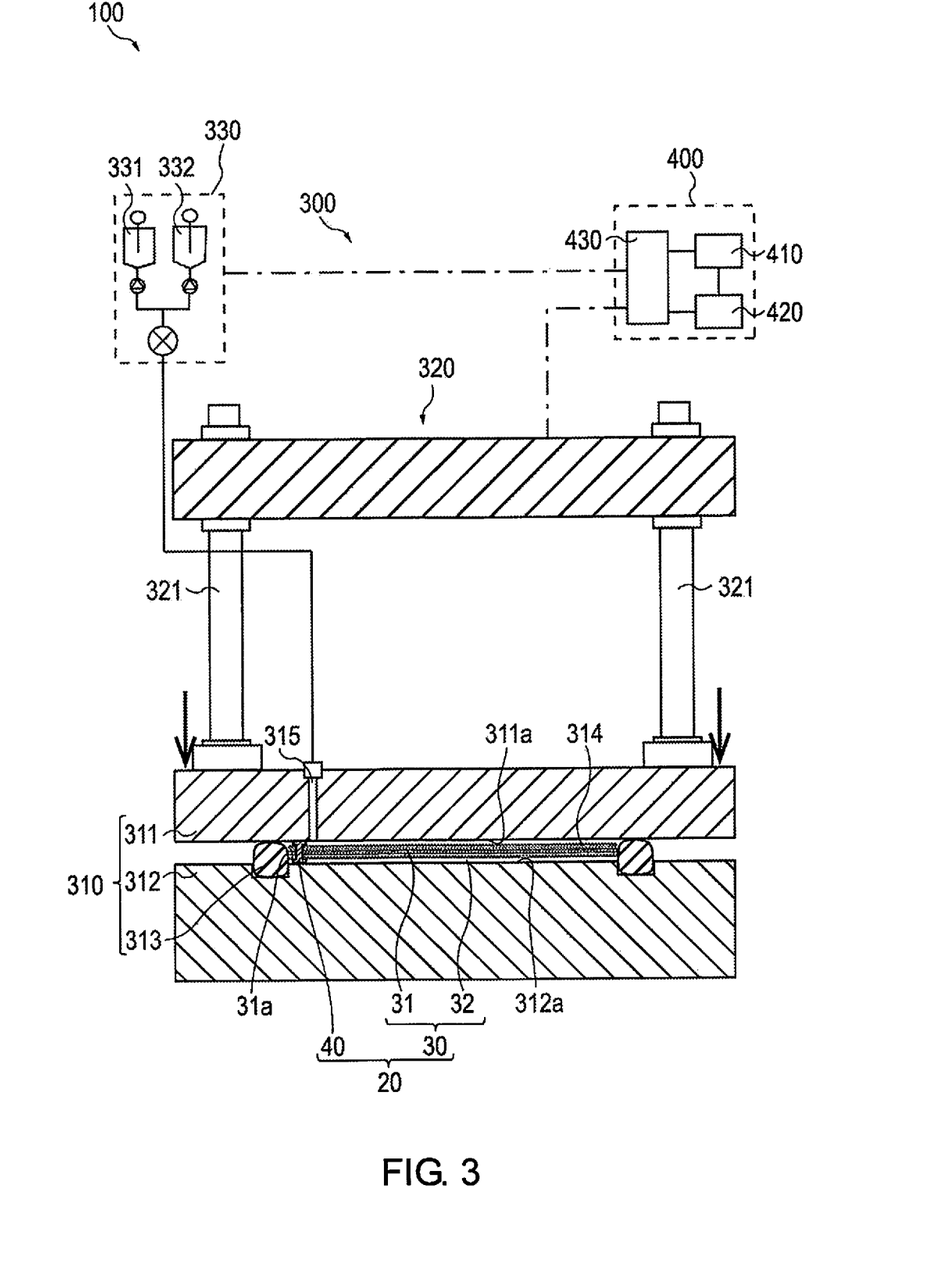
FIG. 3 is a schematic view for explaining a configuration of a composite material molding unit in accordance with the embodiment.

The composite material molding unit 300 comprises an openable/closable molding die 310 that forms a cavity 314 in which the intermediate member 20 is disposed, a pressing unit 320 for applying clamping pressure to the molding die 310, and a resin injection unit 330 for injecting the molten resin 50 into the cavity 314, as is illustrated in FIG. 3.

The molding die 310 includes an upper die 311 and a lower die 312, forming a pair, which can be opened and closed, and a seal part 313. A hermetically sealable cavity 314 is formed between a wall surface 311a of the upper die 311, a wall surface 312a of the lower die 312, and the seal part 313. The molding die 310 further comprises an injection port 315 for injecting the resin 50 into the cavity 314.

The seal part 313 is formed from an elastic material, such as rubber, and seals the mating surfaces of the upper die 311 and the lower die 312. The seal part 313 deforms as a function of the clamping pressure of the molding die 310 to adjust the distance between the upper die 311 and the lower die 312. The height of the cavity 314 can thereby be adjusted. The molding die 310 is not limited to the configuration described above as long as it is possible to form the sealed cavity 314 and to adjust the distance between the upper die 311 and the lower die 312.

Figure 5:
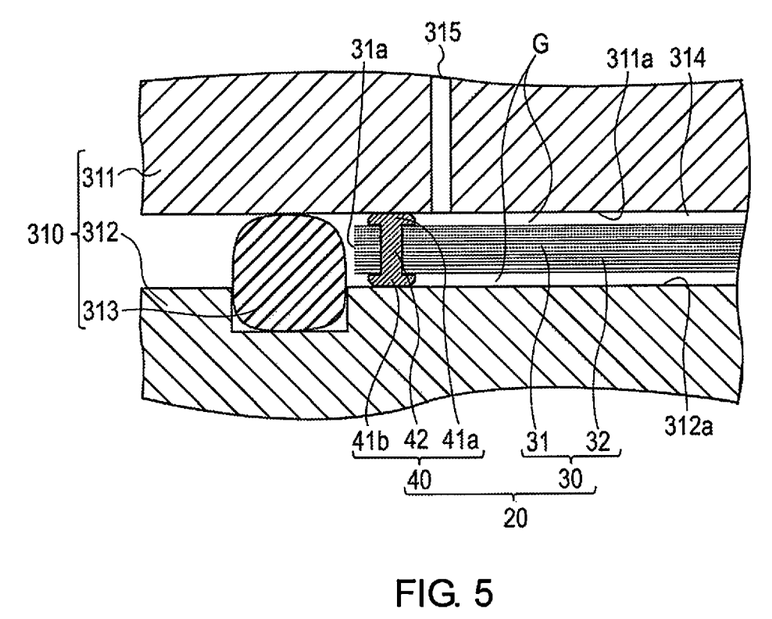
FIG. 5 is a cross-sectional view illustrating a state in which the intermediate member for composite material in accordance with the embodiment is disposed in a molding die.

The head portions 41a, 41b of the penetrating member 40 are disposed to project from the reinforcing base material 31 in a state in which the intermediate member 20 is disposed within the cavity 314, as illustrated in FIG. 5. As a result, the head portions 41a, 41b are interposed between the reinforcing base material 31 and the wall surfaces 311a, 312a of the molding die 310, in a state in which the intermediate member 20 is disposed within the cavity 314. A gap G is thereby formed between the reinforcing base material 31 and the wall surfaces 311a, 312a of the molding die 310. The resin 50 that is injected into the cavity 314 can be made to flow smoothly by utilizing the gap G as a flow channel. Because the reinforcing base material 31 is more readily impregnated with the resin 50, it is possible to increase the injection rate of the resin 50 (the injection amount of the resin 50 per unit time). It is thereby possible to further shorten the molding time of the composite material 10 as the molded article.

Again with reference to FIG. 3, the injection port 315 is provided so that the resin injection unit 330 can communicate with the cavity 314. In the present embodiment, only one injection port 315 is provided in the vicinity of an end portion (seal part 313) of the cavity 314 of the upper die 311. The interior of the preform 30 is impregnated with the resin 50 that is injected from the resin injection unit 330 from the surface. A suction port for drawing air to evacuate the cavity 314 may be separately provided in the molding die 310.

The pressing unit 320 may be composed of, for example, a pressing machine comprising cylinders 321 that use fluid pressure such as hydraulic pressure, and that can freely adjust the clamping pressure to be applied to the molding die 310 through control of the hydraulic pressure, and the like.

The resin injection unit 330 may be composed of a well-known circulation pump mechanism that is able to supply a main agent from a main agent tank 331 and a curing agent from a curing agent tank 332 to the molding die 310 while circulating the main agent and curing agent. The resin injection unit 330 communicates with the injection port 315 and injects the resin 50 into the cavity 314.

The control unit 400 controls the operation of the entire molding device 100. Specifically, with reference to FIG. 3, the control unit 400 comprises a storage unit 410, a calculation unit 420, and an input/output unit 430 that sends and receives various data and control commands. The input/output unit 430 is electrically connected to each unit of the device, such as the pressing part 210, the pressing unit 320, and the resin injection unit 330.

The storage unit 410 is composed of a ROM and a RAM and stores data, such as the shape (height) of the penetrating member 40 and the design thickness of the composite material 10 as the molded article. The calculation unit 420 is composed primarily of a CPU and receives data, such as the clamping pressure and the height of the cavity 314 via the input/output unit 430. The calculation unit 420 calculates the clamping pressure of the molding die 310, the injection pressure of the resin 50, etc., based on data read from the storage unit 410, as well as data received from the input/output unit 430. Control signals based on the calculated data are transmitted to each unit of the device, such as the pressing unit 320 and the resin injection unit 330 via the input/output unit 430. In this manner, the control unit 400 controls the clamping pressure of the molding die 310, the injection pressure of the resin 50, and the like.

Figure 4:
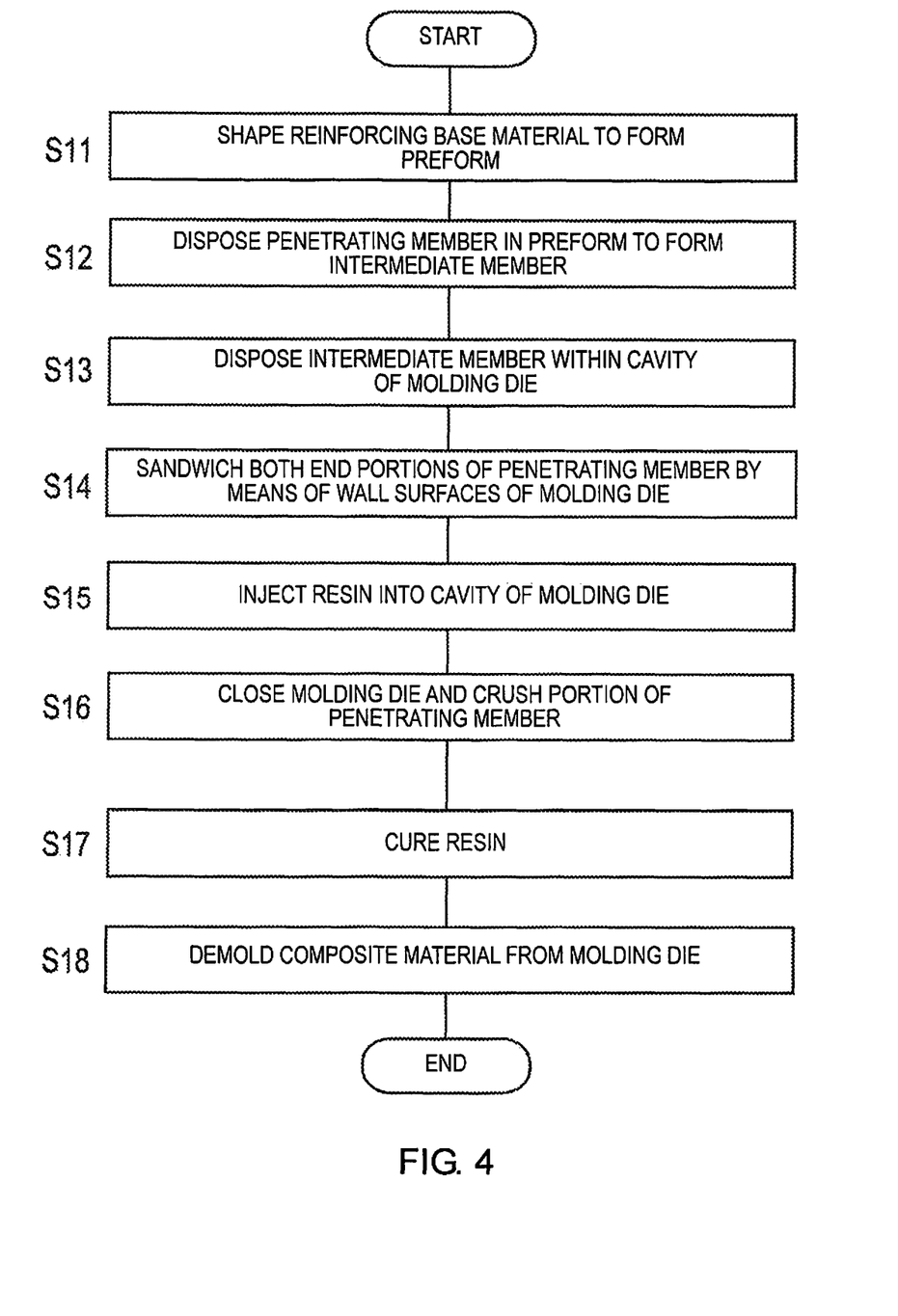
FIG. 4 is a flowchart illustrating the molding method for the composite material in accordance with the embodiment.

The molding method for composite material 10 in accordance with the present embodiment will now be described. In general, in the molding method for composite material 10, first, the preform 30 is formed (Step S11), and the penetrating member 40 is disposed on the preform 30 to form the intermediate member 20 (Step S12), as is illustrated in FIG. 4. Next, the intermediate member 20 is disposed within the cavity 314 of the molding die 310 (Step S13), and both end portions 40a, 40b of the penetrating member 40 are sandwiched by means of the wall surfaces 311a, 312a of the molding die 310 (Step S14). Next, the resin 50 is injected into the cavity 314 of the molding die 310 (Step S15). After the cavity 314 is filled with the resin 50, the molding die 310 is closed further and a portion of the penetrating member 40 is crushed (Step S16). Next, the resin 50 is cured (Step S17) and the composite material 10 is demolded (Step S18). The molding method for composite material 10 will be described in detail below.

In Step S11, a plurality of the reinforcing base materials 31 are stacked and the adhesive 32 is applied to form the preform 30 that is formed to a prescribed shape. First, the adhesive 32 is applied to the sheet-shaped reinforcing base material 31. Next, the plurality of the reinforcing base materials 31 to which the adhesive 32 is applied are stacked. Thereafter, the stacked reinforcing base materials 31 are shaped using a shaping mold (not shown) to form a preform 30 that has a prescribed shape (refer to FIG. 1A). The reinforcing base material 31 may be heated before being shaped to soften the adhesive 32. Alternatively, the reinforcing base material 31 may be cut to a prescribed shape before or after the reinforcing base material 31 is shaped.

In Step S12, first, the penetrating member 40 is disposed on one surface of the preform 30 and a pressing force is applied to the head portion 41a of the penetrating member 40 with the pressing part 210 of the intermediate member forming unit 200 in the stacking direction of the reinforcing base materials 31 (direction of the arrow in FIG. 2A), as illustrated in FIG. 2A. As a result, the body portion 42 of the penetrating member 40 penetrates the preform 30 (reinforcing base material 31) through the gaps G between the fibers of the reinforcing base material 31, as is illustrated in FIG. 2B.

Moreover, pressing force is applied to the penetrating member 40 with the pressing part 210. The end portion 40b of the penetrating member 40 is pressed against the recessed portion 220a of the receiving part 220 and deforms, and the head portion 41b, to which the shape of the recessed portion 220a is transferred, is formed at the end portion 40b of the penetrating member 40, as is illustrated in FIG. 2C. Thus, the intermediate member 20, in which the head portions 41a, 41b of the penetrating member 40 are fixed to the reinforcing base material 31, is formed so as to sandwich the reinforcing base material 31.

In Step S13, the intermediate member 20 is disposed within the cavity 314 so that the penetrating member 40 is in the vicinity of the injection port 315 of the molding die 310 as well as farther on an outer peripheral edge 31a side of the reinforcing base material 31 than the injection port 315, as is illustrated in FIGS. 3 and 5. Since the flow of the resin 50 is fastest in the vicinity of the injection port 315, disorder in the arrangement of the reinforcing base material 31 tends to occur. As described above, by disposing the penetrating member 40 in the vicinity of the injection port 315, it is possible to suitably suppress the disorder in the arrangement of the reinforcing base material 31. In addition, by disposing the penetrating member 40 farther on the outer peripheral edge 31a side of the reinforcing base material 31 than the injection port 315, it is possible to prevent the penetrating member 40 from inhibiting the flow of the resin 50.

In Step S14, the molding die 310 is closed such that the distance between the wall surfaces 311a, 312a of the molding die 310 coincides with the height of the penetrating member 40, as is illustrated in FIG. 5. As a result, the wall surfaces 311a, 312a are in contact with the head portions 41a, 41b (both end portions 40a, 40b) of the penetrating member 40, and the penetrating member 40 can be sandwiched and fixed by means of the wall surfaces 311a, 312a, and a gap G can be formed in at least a portion of the space between the reinforcing base material 31 and the wall surfaces 311a, 312a of the molding die 310.

Figure 6:
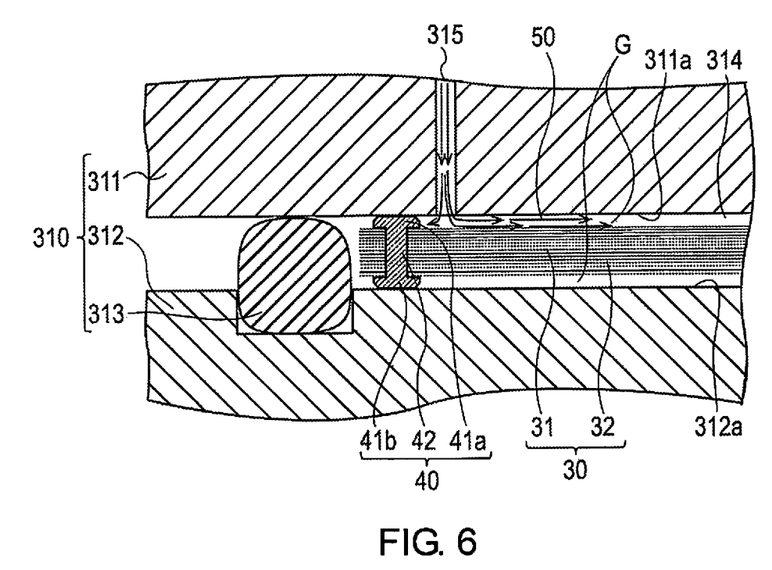
FIG. 6 is a cross-sectional view illustrating a way in which resin is injected into a cavity of the molding die.

In Step S15, the resin 50 is injected into the cavity 314 via the injection port 315 by the resin injection unit 330, while the clamped state of the penetrating member 40 is maintained, as illustrated in FIG. 6. At this time, the resin 50 that is injected into the cavity 314 can be made to flow smoothly by utilizing the gap G between the reinforcing base material 31 and the wall surfaces 311a, 312a of the molding die 310 as a flow channel. Because the reinforcing base material 31 is more readily impregnated with the resin 50, the injection rate of the resin 50 (the injection amount of the resin 50 per unit time) can be increased. The clamping pressure that is applied by the pressing unit 320 is adjusted such that the molding die 310 does not open due to an increase in the internal pressure of the cavity 314 caused by the injection of the resin 50.

Figure 8A:
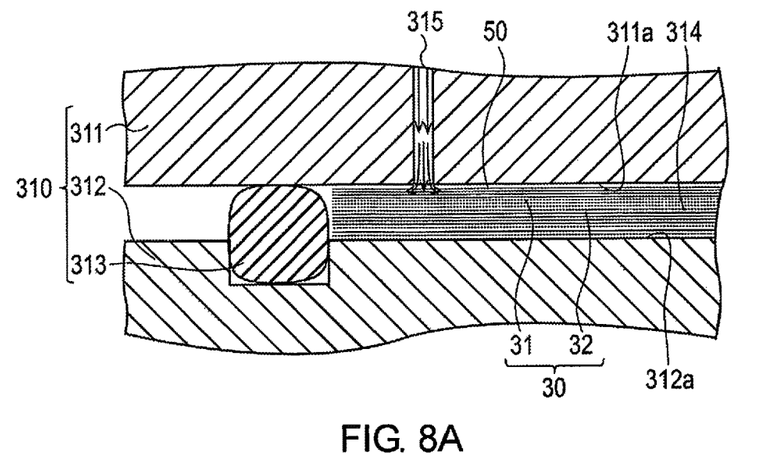
FIG. 8A is a cross-sectional view illustrating a way in which the composite material is molded by means of the molding method for composite material in accordance with a comparative example.
Figure 8B:
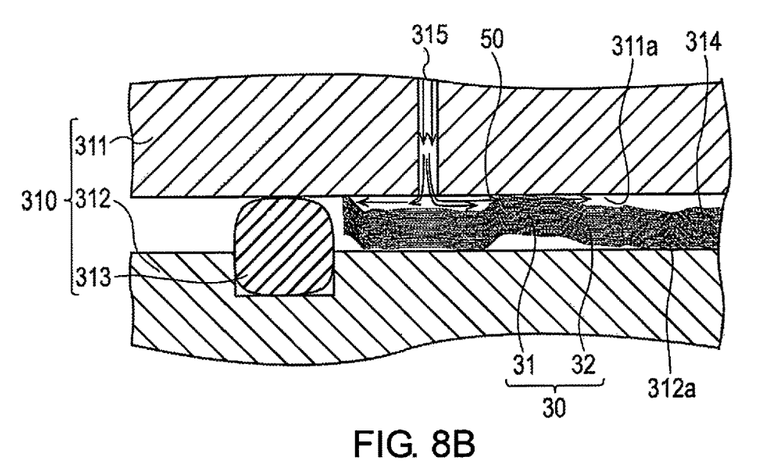
FIG. 8B is a cross-sectional view illustrating the way in which the composite material is molded by means of the molding method for composite material in accordance with the comparative example.
Figure 8C:
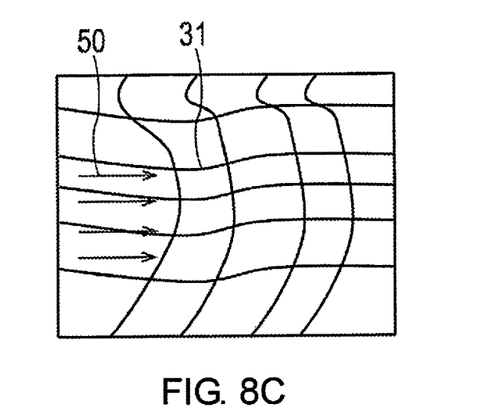
FIG. 8C is a top view illustrating a state of the reinforcing base material of the composite material that is molded by means of the molding method for composite material in accordance with the comparative example.

If the resin 50 were injected into the cavity 314 in a state in which the reinforcing base material 31 is sandwiched by the wall surfaces 311a, 312a of the molding die 310, as in the comparative example shown in FIG. 8A, the reinforcing base material 31 would impede the flow of the resin 50. As a result, the flow resistance increases compared to a case in which the gap G is formed, as in the present embodiment. If the injection pressure of the resin 50 is increased in order to reduce the molding time, disorder in the arrangement of the reinforcing base material 31 may occur due to the flow of the resin, as illustrated in FIGS. 8B and 8C. Curing the resin 50 in this state causes the quality of the composite material 10 to deteriorate.

In the present embodiment, when the resin 50 is injected into the cavity 314, the disorder in the arrangement of the reinforcing base material 31 can be suppressed by means of the penetrating member 40. Moreover, it is possible to decrease the flow resistance of the resin 50 by forming the gap G. It is thereby possible to mold a higher-quality composite material 10 in a relatively short period of time without causing disorder in the arrangement of the reinforcing base material 31, even if the injection rate of the resin 50 is increased.

Figure 7A:
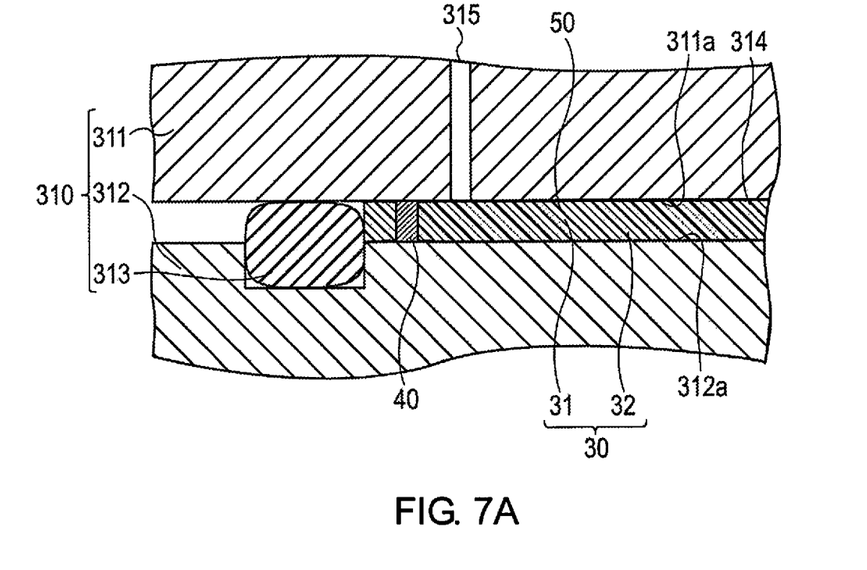
FIG. 7A is a cross-sectional view illustrating a way in which a portion of the penetrating member that is disposed within the cavity of the molding die is crushed.

In Step S16, the clamping pressure of the molding die 310 is increased with the pressing unit 320, and the molding die 310 is closed further, in order to crush a portion of the penetrating member 40, as is illustrated in FIG. 7A. It is thereby possible to reduce the gap G between the reinforcing base material 31 and the wall surfaces 311a, 312a of the molding die 310. Here, because the penetrating member 40 is provided with the property of softening with heat, the gap G between the reinforcing base material 31 and the wall surfaces 311a, 312a of the molding die 310 can be suitably reduced by softening the penetrating member by means of the reaction heat of the flowing resin 50 or the heat from the molding die 310, and by crushing the penetrating member in the direction in which the molding die 310 is closed.

Figure 7B:
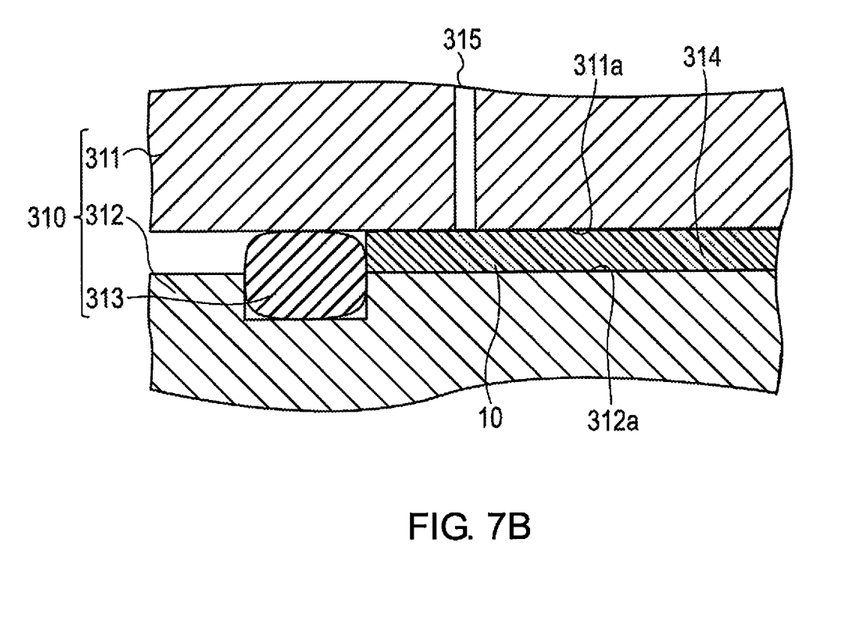
FIG. 7B is a cross-sectional view illustrating a manner in which the portion where the penetrating member was present within the cavity of the molding die is replaced with resin.

As the flow of the resin 50 progresses, the penetrating member 40, which is a thermoplastic resin, gradually melts and mixes with the resin 50. As a result, the portion where the penetrating member 40 was present is replaced with the resin 50, as is illustrated in FIG. 7B. The portion where the penetrating member 40 was present may be replaced with the resin 50, as is illustrated in FIG. 7B, by melting the penetrating member 40 at the same time that the penetrating member 40 is crushed, as is illustrated in FIG. 7A.

In addition, because the penetrating member 40 is formed from the material having affinity with the resin 50, a homogeneous mixture can be achieved without forming an interface or the like, which would affect the physical properties of the composite material 10.

In Step S17, the resin 50 within the cavity 314 is cured. The molding die 310 may be heated at this time, or the molding die 310 may be preheated. In Step S18, after the resin 50 is cured, the molding die 310 is opened and the composite material 10 is demolded. The molding of the composite material 10 is thereby completed.

As described above, in accordance with the molding method for composite material 10 of the present embodiment, the penetrating member 40 is fixed to the reinforcing base material 31 and disposed such that at least one of the end portions 40a, 40b of the penetrating member 40 projects from the reinforcing base material 31, and the reinforcing base material 31 and the penetrating member 40 are disposed within the cavity 314. Next, the molding die 310 is closed, at least one of the end portions 40a, 40b of the penetrating member 40 is brought into contact with the wall surfaces 311a, 312a of the molding die 310 that form the cavity 314, and the resin 50 is injected into the cavity 314 from the injection port 315 of the molding die 310 while the state in which the end portions 40a, 40b are in contact with the wall surfaces 311a, 312a is maintained.

In accordance with the method for manufacturing the composite material 10 configured in this manner, the end portions 40a, 40b of the penetrating member 40 that is fixed to the reinforcing base material 31 are brought into contact with the wall surfaces 311a, 312a of the molding die 310, and the reinforcing base material 31 is held by the penetrating member 40 and the wall surfaces 311a, 312a of the molding die 310. Thus, it is possible to suppress disorder in the arrangement of the reinforcing base material 31 that may occur due to the flow of the resin 50 when the resin 50 is injected into the cavity 314. It is thereby possible to improve the quality of appearance of the composite material 10 as the molded article and to reduce the molding time by enabling high-pressure injection of the resin 50.

In addition, the penetrating member 40 penetrates through the reinforcing base material 31 and is disposed such that both of the end portions 40a, 40b of the penetrating member 40 project from the reinforcing base material 31, and the reinforcing base material 31 and the penetrating member 40 are disposed within the cavity 314. Next, the molding die 310 is closed, both end portions 40a, 40b of the penetrating member 40 are sandwiched by the wall surfaces 311a, 312a of the molding die 310 that form the cavity 314, and the resin 50 is injected into the cavity 314 from the injection port 315 of the molding die 310 while the clamped state of the penetrating member 40 is maintained. Since the penetrating member 40 that penetrates the reinforcing base material 31 is sandwiched by the wall surfaces 311a, 312a of the molding die 310, the disorder in the arrangement of the reinforcing base material 31 that may occur due to the flow of the resin 50 when the resin 50 is injected into the cavity 314 can be reliably suppressed.

Additionally, when the resin 50 is injected, gap G is formed in at least a portion of the space between the reinforcing base material 31 and the wall surfaces 311a, 312a of the molding die 310 by means of the two end portions 40a, 40b of the penetrating member 40. Since the resin 50 that is injected into the cavity 314 flows more smoothly by utilizing the gap G and the reinforcing base material 31 is more readily impregnated with the resin 50, the injection rate of the resin 50 (the injection amount of the resin 50 per unit time) can be increased. Thus, the quality of appearance of the composite material 10 as the molded article can be improved and the molding time can be further reduced.

In addition, the penetrating member 40 is disposed within the cavity 314 in the vicinity of the injection port 315, as well as farther on the outer peripheral edge 31a side of the reinforcing base material 31 than the injection port 315. Since the reinforcing base material 31 can thereby be more smoothly impregnated with the resin 50 without inhibition of the flow of the resin 50 by the penetrating member 40, the molding time can be reduced.

In addition, since the plurality of the reinforcing base materials 31 are stacked before the penetrating member 40 is made to penetrate through the reinforcing base materials 31, the deviation of the plurality of the reinforcing base materials 31 can be suppressed.

Moreover, the penetrating member 40 is provided with the property of softening with heat, and after the resin 50 is injected into the cavity 314, the molding die 310 is closed further and at least a portion of the penetrating member 40 is crushed in the direction in which the molding die 310 is closed. After the resin 50 is injected into the cavity 314, the penetrating member 40 softens from the reaction heat of the flowing resin 50 or the heat from the molding die 310 and is crushed in the direction in which the molding die 310 is closed; the gap G between the reinforcing base material 31 and the wall surfaces 311a, 312a of the molding die 310 can thereby be suitably reduced. It is thereby possible to suppress the formation of excessively resin-rich portions on the surface of the composite material 10, and to improve the strength of the composite material 10.

Additionally, by forming the penetrating member 40 from a thermoplastic resin, the penetrating member 40 can be melted by the reaction heat of the flowing resin 50 or the heat of the molding die 310 when the reinforcing base material 31 is impregnated with the resin 50, thereby replacing the portion where the penetrating member 40 was present with the resin 50. Thus, post-processing for removal of the peripheral portions of the penetrating member 40 and of the reinforcing base material 31 in which the penetrating member 40 is disposed can be reduced. Thus, the molding time can be reduced and the yield can be improved.

In addition, the penetrating member 40 is formed from the material having an affinity with the resin 50 that is injected into the cavity 314. Thus, the composite material 10 can be formed homogeneously, and post-processing for removal of the peripheral portions of the penetrating member 40 and of the reinforcing base material 31 in which the penetrating member 40 is disposed can be reduced. Thus, the molding time can be reduced and the yield improved. In addition, such characteristics of the composite material 10 as the strength can be improved.

Additionally, the intermediate member 20 in accordance with the present embodiment comprises the preform 30 obtained by forming the reinforcing base material 31 into the prescribed shape, and the penetrating member 40 that is fixed to the reinforcing base material 31 and disposed such that at least one of the end portions 40a, 40b projects from the reinforcing base material 31. When the composite material 10 is molded, the reinforcing base material 31 can be held by the end portions 40a, 40b and the wall surfaces 311a, 312a of the molding die 310. Thus, the disorder in the arrangement of the reinforcing base material 31 that may occur due to the flow of the resin 50 when the resin 50 is injected into the cavity 314 of the molding die 310 can be suppressed. Thus, the quality of appearance of the composite material 10 as the molded article can be improved and the molding time can be reduced by enabling high-pressure injection of the resin 50.

In addition, the penetrating member 40 penetrates through the reinforcing base material 31 and is disposed such that both of the end portions 40a, 40b project from the reinforcing base material 31. When the composite material 10 is molded, the reinforcing base material 31 can be more reliably held by sandwiching both of the end portions 40a, 40b of the penetrating member 40 by means of the wall surfaces 311a, 312a of the molding die 310.

In addition, since the preform 30 includes the plurality of the reinforcing base materials 31, the deviation of the plurality of the reinforcing base materials 31 can be suppressed.

Additionally, because the penetrating member 40 is provided with the property of softening with heat, the penetrating member 40 can be crushed by means of the clamping pressure of the molding die 310. Since the height of the penetrating member 40 can thereby be adjusted in accordance with the desired thickness of the composite material 10, the formation of resin-rich portions on the surface of the composite material 10 can be suppressed, and the strength and the quality of appearance of the composite material 10 can be improved.

Additionally, since the penetrating member 40 is formed from a thermoplastic resin, the penetrating member 40 can be melted by the reaction heat of the flowing resin 50 or the heat from the molding die 310 when the reinforcing base material 31 is impregnating with the resin 50, thereby replacing the portion where the penetrating member 40 was present with the resin 50. Thus, post-processing for removal of the peripheral portions of the penetrating member 40 and of the reinforcing base material 31 in which the penetrating member 40 is disposed can be reduced. Thus, the molding time can be reduced and the yield can be improved.

In addition, the penetrating member 40 is formed from the material having an affinity with the resin 50 that is used for the composite material 10. As a result, when the reinforcing base material 31 is impregnated with the resin 50, the penetrating member 40 melts due to the reaction heat of the flowing resin 50 or the heat from the molding die 310 and mixes with the resin 50, and is integrally formed therewith. Thus, the composite material 10 can be homogeneously formed, and post-processing for the removal of the peripheral portions of the penetrating member 40 and the reinforcing base material 31 in which the penetrating member 40 is disposed can be reduced. Thus, the molding time can be reduced and the yield improved. In addition, such characteristics of the composite material 10 as the strength can be improved.

An intermediate member for composite material 620 and a molding method for composite material 10 in accordance with a modified example will be described with reference to FIGS. 10 and 11.

A support member 640 of the intermediate member for composite material 620 in accordance with the modified example differs from the penetrating member (support member) 40 of the above-mentioned embodiment in that the support member does not have a portion that penetrates the reinforcing base material 31 and in that one end portion 640a is fixed so as to project from the reinforcing base material 31. The same reference symbols have been assigned to configurations that are the same as in the embodiment described above, and the descriptions thereof have been omitted.

Figure 10:
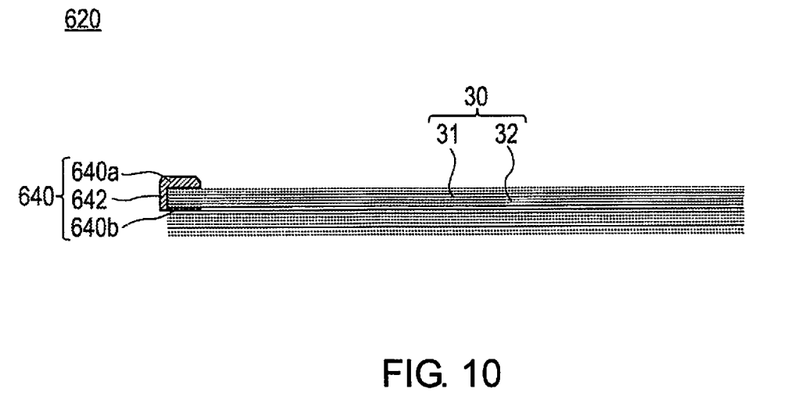
FIG. 10 is a cross-sectional view illustrating the intermediate member for composite material in accordance with the modified example.

The support member 640 is configured into the form of a clip that clamps a portion of the reinforcing base material 31 of the preform 30, as is illustrated in FIG. 10. The support member 640 includes one end portion 640a that is fixed so as to project from the reinforcing base material 31, another end portion 640b that is disposed opposing the one end portion 640 sandwiching a portion of the reinforcing base material 31, and a connecting portion 642 that connects the end portions 640a, 640b to each other.

The same material as the material that constitutes the penetrating member 40 in accordance with the above-described embodiment may be used as the material that constitutes the support member 640.

The molding method for composite material 10 in accordance with the modified example differs from the above-described embodiment in that the support member 640 is not made to penetrate the preform 30 in Step S12 (refer to FIG. 4), and in that the two end portions 640a, 640b of the support member 640 are not sandwiched in Step S14 (refer to FIG. 4). The other steps of the molding method for composite material 10 in accordance with the modified example are the same as those of the above-described embodiments; therefore, the descriptions thereof have been omitted.

In Step S12 of the molding method for composite material 10 in accordance with the modified example, a portion of the reinforcing base material 31 is sandwiched by the support member 640. As a result, the support member 640 is fixed to the reinforcing base material 31 and is disposed such that the one end portion 640a of the support member 640 projects from the reinforcing base material 31. Since the support member 640 is not made to penetrate through the reinforcing base material 31, the support member 640 can be easily fixed to the reinforcing base material 31 in a relatively short period of time.

Figure 11:
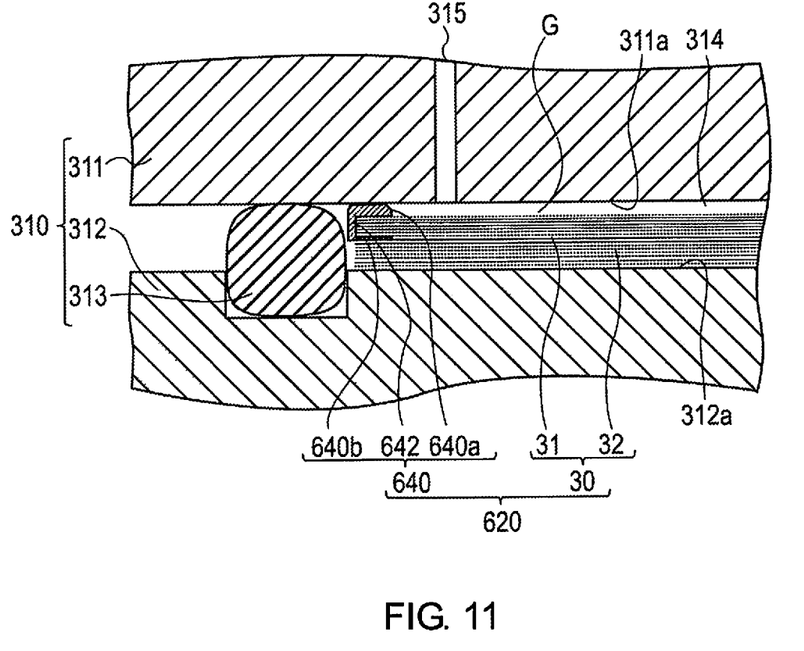
FIG. 11 is a cross-sectional view illustrating a state in which the intermediate member for composite material in accordance with the modified example is disposed in the molding die.

In Step S14, the one end portion 640a of the support member 640 is brought into contact with one wall surface 311a of the molding die 310, as is illustrated in FIG. 11. The end portion 640a of the support member 640 is interposed between the reinforcing base material 31 and the one wall surface 311a of the molding die 310 to form a gap G.

The resin 50 is injected into the cavity 314 in the next step while the state shown in FIG. 11 is maintained. At this time, the resin 50 that is injected into the cavity 314 can be made to flow smoothly by utilizing the gap G as a flow channel.

As described above, the molding method for composite material 10 and the intermediate member for composite material 620 in accordance with the modified example achieve the same effects as the above-described embodiment with a similar configuration.

Moreover, in the molding method for composite material 10 in accordance with the modified example, the support member 640 is fixed to the reinforcing base material 31 and is disposed such that the one end portion 640a of the support member 640 projects from the reinforcing base material 31, and the reinforcing base material 31 and the support member 640 are disposed within the cavity 314. Next, the molding die 310 is closed, the one end portion 640a of the support member 640 is brought into contact with the one wall surface 311a of the molding die 310 that forms the cavity 314, and the resin 50 is injected into the cavity 314 from the injection port 315 of the molding die 310 while the state in which the end portion 640a is brought into contact with the one wall surface 311a is maintained.

In accordance with the method for manufacturing the composite material 10 configured in this manner, the end portion 640a of the support member 640 is brought into contact with the one wall surface 311a, and the reinforcing base material 31 is sandwiched by the end portion 640a of the support member 640 and the other wall surface 311b. Thus, disorder in the arrangement of the reinforcing base material 31 that may occur due to the flow of the resin 50 when the resin 50 is injected into the cavity 314 can be suppressed. Thus, the quality of appearance of the composite material 10 as the molded article can be improved and the molding time reduced by enabling high-pressure injection of the resin 50.

In addition, the intermediate member 620 for composite material in accordance with the modified example comprises the preform 30 obtained by forming the reinforcing base material 31 into the prescribed shape, and the support member 640 that is fixed to the reinforcing base material 31 and disposed such that the one end portion 640a projects from the reinforcing base material 31. When the composite material 10 is molded, the end portion 640a of the support member 640 can be brought into contact with the one wall surface 311a, and the reinforcing base material 31 can be sandwiched by the support member 640 and the other wall surface 311b. Thus, disorder in the arrangement of the reinforcing base material 31 that may occur due to the flow of the resin 50 when the resin 50 is injected into the cavity 314 of the molding die 310 can be suppressed. The quality of appearance of the composite material 10 as the molded article can thereby be improved and the molding time reduced by enabling high-pressure injection of the resin 50.

The molding method and the intermediate member for composite material were described by means of an embodiment and a modified example, but the present invention is not limited to the configurations described in the embodiment and the modified example and may be appropriately modified based on the descriptions in the Claims.

For example, in the molding method and the intermediate member for composite material, the support member is not limited to a configuration in which the support member is fixed to the reinforcing base material by penetrating or sandwiching the reinforcing base material; the support member may be fixed to the reinforcing base material by joining thereto with an adhesive, or the like.

Moreover, the molding method for composite material is not limited to a configuration in which the intermediate member for composite material is disposed within the cavity of the molding die and in which both end portions of the support member are sandwiched by the wall surfaces of the molding die; at least one of the end portions of the support member may be brought into contact with the wall surface of the molding die.

Moreover, the shape of the support member is not particularly limited to the shapes described in the embodiment and the modified example as long as the support member fixes the reinforcing base material and is disposed such that at least one of the end portions thereof projects from the reinforcing base material.

Moreover, the material that forms the support member is not limited to an organic material such as resin, and may be an inorganic material such as a metal material. In this case, it is preferred that a material that is soft enough to be crushed by the clamping pressure of the molding die be used. An example of such a soft material is aluminum.

Moreover, the material that is softened by heat which forms the support member is not limited to thermoplastic resin and may be a thermosetting resin such as low-molecular epoxy. Use of the same type of material as the resin, which is the base material of the composite material, makes it possible to form a more homogeneous composite material. Moreover, the invention is not limited to a configuration in which, during injection of the resin into the cavity, all of the portions where the support member was present are replaced with the injected resin; at least a part of the portion where the support member was present may be replaced with the injected resin.

In addition, post-processing for removal of the peripheral portions of the support member and of the reinforcing base material in which the support member is disposed may be carried out after the resin is injected into the cavity of the molding die.

Moreover, although the composite material is configured to be formed by the stacking of a plurality of the reinforcing base materials, the composite material may be formed from a single reinforcing base material.

The invention claimed is:

1. A molding method for molding a composite material by disposing a reinforcing base material within a cavity of an openable/closable molding die, injecting resin into the cavity, and curing the resin, the molding method comprising:
causing a support member to penetrate the reinforcing base material and disposing the support member such that at least one end portion of the support member projects from the reinforcing base material;
disposing the reinforcing base material and the support member within the cavity;
closing the molding die and bringing the at least one end portion of the support member in contact with the wall surfaces of the molding die that form the cavity; and
injecting the resin into the cavity from an injection port of the molding die while maintaining a state in which the at least one end portion of the support member is in contact with the wall surfaces.

2. The molding method according to claim 1, wherein
the support member is disposed such that both end portions of the support member project from the reinforcing base material during the causing of the support member to penetrate the reinforcing base material,
the both end portions of the support member are sandwiched by the wall surfaces of the molding die during the closing of the molding die, and
a clamped state of the support member is maintained during the injecting of the resin.

3. The molding method according to claim 1, wherein
a gap is formed in at least a portion of a space between the reinforcing base material and the wall surfaces of the molding die by the at least one end portion of the support member during the injecting of the resin.

4. The molding method according to claim 1, wherein
the support member is disposed within the cavity in a vicinity of the injection port and farther on an outer peripheral edge side of the reinforcing base material than the injection port.

5. The molding method according to claim 1, wherein
a plurality of the reinforcing base materials are stacked before the support member is caused to penetrate the reinforcing base material.

6. The molding method according to claim 1, wherein
the support member is provided with a property of softening with heat, and
the molding die is closed further and at least a portion of the support member is crushed in a direction in which the molding die is closed after the injecting of the resin.

7. The molding method according to claim 6, wherein
the support member is formed from a thermoplastic resin, and
at least a part of the portion where the support member was present is replaced with the injected resin during the injecting of the resin into the cavity.

8. The molding method according to claim 1, wherein
the support member is formed from a material having an affinity with the resin that is injected into the cavity.

9. The molding method according to claim 1, wherein
the reinforcing base material and the support member are disposed within the cavity after causing the support member to penetrate the reinforcing base material.

* * * * *